US012025691B2

(12) United States Patent
Davis et al.

(10) Patent No.: US 12,025,691 B2
(45) Date of Patent: Jul. 2, 2024

(54) SYSTEMS AND METHODS FOR RADAR DETECTION HAVING INTELLIGENT ACOUSTIC ACTIVATION

(71) Applicants: Jeremey M. Davis, New Port Richey, FL (US); Ira W. Bryant, Jr., Lakeland, FL (US)

(72) Inventors: Jeremey M. Davis, New Port Richey, FL (US); Ira W. Bryant, Jr., Lakeland, FL (US)

(*) Notice: Subject to any disclaimer, the term of this patent is extended or adjusted under 35 U.S.C. 154(b) by 525 days.

(21) Appl. No.: 17/322,436

(22) Filed: May 17, 2021

(65) Prior Publication Data

US 2022/0365198 A1    Nov. 17, 2022

(51) Int. Cl.
| | |
|---|---|
| *G01S 13/86* | (2006.01) |
| *G01S 13/58* | (2006.01) |
| *G01S 13/88* | (2006.01) |
| *G06N 20/00* | (2019.01) |
| *H04R 3/00* | (2006.01) |

(52) U.S. Cl.
CPC ............ *G01S 13/86* (2013.01); *G01S 13/58* (2013.01); *G01S 13/88* (2013.01); *G06N 20/00* (2019.01); *H04R 3/005* (2013.01)

(58) Field of Classification Search
CPC .......... G01S 13/86; G01S 13/58; G01S 13/88
See application file for complete search history.

(56) References Cited

U.S. PATENT DOCUMENTS

| | | | | |
|---|---|---|---|---|
| 5,781,505 A | * | 7/1998 | Rowland | F41J 5/06 367/906 |
| 6,215,731 B1 | * | 4/2001 | Smith | G01S 3/00 367/128 |
| 7,030,905 B2 | * | 4/2006 | Carlbom | G06T 7/20 348/153 |
| 7,104,496 B2 | * | 9/2006 | Chang | F42B 12/32 342/52 |
| 7,233,545 B2 | * | 6/2007 | Harvey, Jr. | G01S 5/22 367/127 |
| 8,149,156 B1 | * | 4/2012 | Allred | G01S 13/583 342/146 |
| 9,612,326 B2 | * | 4/2017 | Herbel | F41G 3/147 |

(Continued)

*Primary Examiner* — Marcus E Windrich
(74) *Attorney, Agent, or Firm* — Monarch IP Group, PLLC; April M. Mosby

(57) ABSTRACT

The disclosed system and method for smart detection of an armament projectile can mitigate the detection of its radar by counter-radar systems. Particularly, the system may include an array of acoustic sensors for sensing one or more volleys associated with an armament projectile. An intelligent filtering module, coupled to the array of acoustic sensors, may select a volley based upon a learning algorithm, which can be applied to a target profile of historical system data logs. Based upon sensed parameters of the volley, the intelligent filtering module can calculate a radiation duration and a search fan width for radar transmission. Specifically, a controller, within the intelligent filtering module, may couple to actuate the radar at the calculated search fan width for the calculated radiation duration. In some embodiments, the intelligent filtering module can selectively actuate one radar based upon highest expanded detection probability relative to location and status.

20 Claims, 10 Drawing Sheets

(56) References Cited

U.S. PATENT DOCUMENTS

| | | | |
|---|---|---|---|
| 2009/0309781 A1* | 12/2009 | Tietjen | G01S 7/412 342/52 |
| 2012/0217301 A1* | 8/2012 | Namey | F41G 3/04 235/411 |
| 2020/0247403 A1* | 8/2020 | Beuth | G01S 13/86 |

* cited by examiner

SYSTEMS AND METHODS FOR RADAR DETECTION HAVING INTELLIGENT ACOUSTIC ACTIVATION

BACKGROUND

Currently, there are a variety of radar systems that can be used for the detection and tracking of one or more targeted objects. Radio detection and ranging can be used to accomplish this detection. Particularly, radar systems typically emit electromagnetic energy in the direction of a targeted object. Consequently, the radar's receiver can be actuated to capture the scattered energy that is reflected back towards the radar. At this point, the signal processor within the radar can analyze the time difference of arrival, Doppler shift, and various other changes in the reflected energy to calculate the location and movement of the target object.

Anti-radar weapon systems, however, exist which can identify and destroy an active radar system by sensing the broadcasted energy emitted by the radar. Particularly, during operation, a counter-target acquisition radar must be active when a projectile is in flight. Yet, due to the inability to know exactly when the projectile will be launched, the operator must keep the radar actively emitting for more time than is necessary in order to detect the projectile, and to determine the point of origin and impact. It is during this time of over-exposure that the anti-radar weapon system seeks to identify and destroy an active radar system.

In prior decades, manual processes were used to minimize the chances of an active radar being identified. For example, operators of the radar systems would use the terrain to mask the energy. Alternatively, an operator could randomize the starting time for radar signal emission. Further, an operator could randomize the radar duration or displace the radar system to a different location once a certain threshold of radiating time was reached. In recent military operations, limiting radar emissions has not been a concern due to the low probability of encountering anti-radar weapon systems. In the contemporary operating environment, however, there is an increased risk of an active radar system being identified and destroyed.

It is within this context that the embodiments arise.

SUMMARY

Embodiments of a system and method for smart detection of an armament projectile are provided. It should be appreciated that the present embodiment can be implemented in numerous ways, such as a process, an apparatus, a system, a device, or a method. Several inventive embodiments are described below.

In some embodiments, a system and method for smart detection of an armament projectile is provided. The method may include detecting a launch of the armament projectile using an acoustic sensor. For example, the method may include actuating the acoustic sensor to capture audio and detect a volley, wherein the volley may indicate the launch of the armament projectile. Audio profiles of previously observed volleys may be compared to the capture audio to detect a volley associated with a user preference. In some embodiments, a search zone may be retrieved from memory and compared with the location of the source of the volley to detect whether the source is within a predetermined zone. In other embodiments, an exclusion zone may be compared with the location of the source of the volley to detect whether the source is outside of the exclusion zone. When the source is determined to be within a predetermined zone, the method may include capturing one or more parameters associated with the volley and storing these in a target profile. Additionally, the method may include selecting one radar from an array of radars based upon whether the radar possesses the highest expanded detection probability relative to its location and status. Further, the method may include calculating a radiation duration and a search fan width based upon a learning algorithm associated with a target profile of historical system data and logs. Specifically, the method may include retrieving the target profile and calculating the radiation duration from the detected distance from the source and the detected direction of the projectile. The search fan width may be calculated based upon the source location, volley duration, detected distance and the detected direction. Moreover, the method may include activating the radar for a period equal to the calculated radiation duration, wherein the transmitted radar signal having the calculated search fan width. The method may include sensing the reflected radar signal. Accordingly, the method may include using the radar to detect one or more parameters associated with location and motion of the projectile as input to track the armament projectile.

In some embodiments, a system for smart detection of an armament projectile is provided. The system may include an array of acoustic sensors for sensing one or more volleys associated with one or more armament projectiles. For example, each one of the sensors of the array of acoustic sensors may include an acoustic receiver coupled to an acoustic bearing/range estimation module for generating a signal associated with direction of the sonic wave, wherein signal processor may couple to both the acoustic receiver and the acoustic bearing/range estimation module. The system may further include an intelligent filtering module that may be coupled to the array of acoustic sensors for selecting a volley based upon a learning algorithm as applied to a target profile of historical system data logs. For example, a target profile may include one or more parameters associated with the volley such as source location, volley duration, distance between the armament projectile and the acoustic sensor, and direction of the armament projectile with respect to the acoustic sensor. The system may also include a radar coupled to the intelligent filtering module, wherein the radar may be actuated by the intelligent filtering module to emit an electromagnetic signal of a search fan width at a specific time for a specific radiation duration. In some embodiments, the intelligent filtering module may calculate the radiation duration and the search fan width of radar emission associated with the radar. In other embodiments, the system may include a network of radars coupled to the intelligent filtering module, wherein the intelligent filtering module actuates one radar within the network of radars based upon an expanded detection probability, the radar location and the radar status; wherein, the expanded detection probability may be calculated based upon the detection probability, ordinance type, orientation, aspect angle, detected obstructions, and ground elevation data.

In some embodiments, a tangible, non-transitory, computer-readable media having instructions whereupon which, when executed by a processor, cause the processor to perform the smart detection of an armament projectile method described herein. The method may include detecting a launch of the armament projectile using an acoustic sensor. For example, the method may include actuating the acoustic sensor to capture audio and detect a volley, wherein the volley may indicate the launch of the armament projectile. Audio profiles of previously observed volleys may be compared to the capture audio to detect a volley associated with a user preference. In some embodiments, a search zone may be retrieved from memory and compared with the location of the source of the volley to detect whether the source is within a predetermined zone. In other embodiments, an exclusion zone may be compared with the location of the source of the volley to detect whether the source is outside of the exclusion zone. When the source is determined to be within a predetermined zone, the method may capturing one or more parameters associated with the volley and storing these in a target profile. Additionally, the method may include selecting one radar from an array of radars based upon whether the radar possesses the highest expanded detection probability relative to its location and status. Further, the method may include calculating a radiation duration and a search fan width based upon a learning algorithm associated with a target profile of historical system data and logs. Specifically, the method may include retrieving the target profile and calculating the radiation duration from the detected distance from the source and the detected direction of the projectile. The search fan width may be calculated based upon the source location, volley duration, detected distance and the detected direction. Moreover, the method may include activating the radar for a period equal to the calculated radiation duration, wherein the transmitted radar signal having the calculated search fan width. The method may include sensing the reflected radar signal. Accordingly, the method may include using the radar to detect one or more parameters associated with location and motion of the projectile as input to track the armament projectile.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
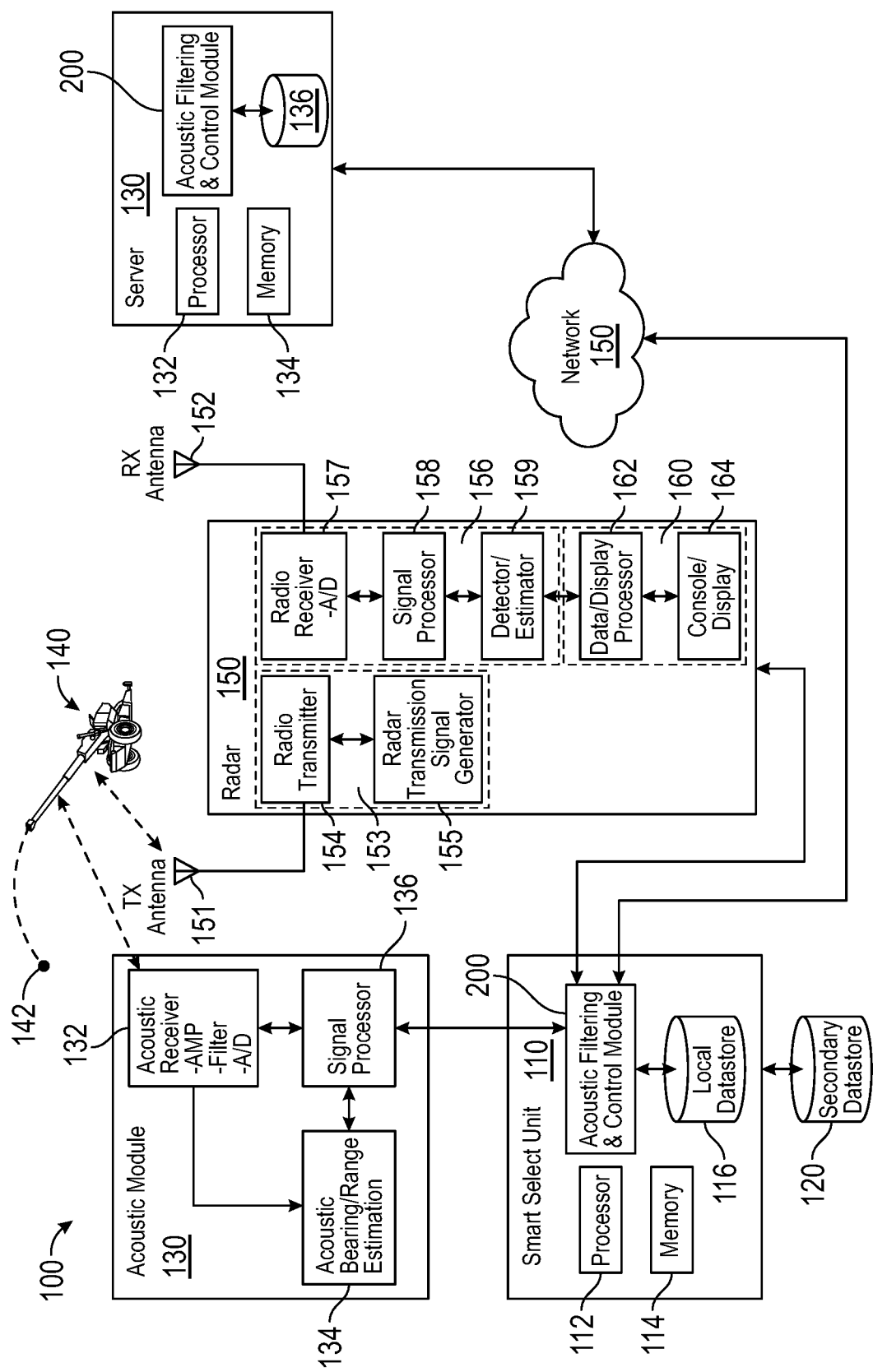
FIG. 1 is a system diagram of a radar system having intelligent acoustic activation for detection of armament projectiles including a smart select unit coupled to a server, in accordance with some embodiments.

The following embodiments describe a system and method for smart detection of an armament projectile. It can be appreciated by one skilled in the art, that the embodiments may be practiced without some or all of these specific details. In other instances, well known process operations have not been described in detail in order not to unnecessarily obscure the embodiments.

The networked computer system for smart detection of an armament projectile described herein may include an array of acoustic sensors for sensing one or more volleys associated with one or more armament projectiles. For example, each one of the sensors of the array of acoustic sensors may include an acoustic receiver coupled to an acoustic bearing/range estimation module for generating a signal associated with direction of the sonic wave, wherein signal processor may couple to both the acoustic receiver and the acoustic bearing/range estimation module. The system may further include an intelligent filtering module that may be coupled to the array of acoustic sensors for selecting a volley based upon a learning algorithm as applied to a target profile of historical system data logs. Specifically, due to differences between the speed of sound and projectile velocity, the primary use would be to activate the radar array based on the initial detection of a volley and then keep the radar active for a period of time in order to track subsequent volleys. For example, a target profile may be generated that includes one or more parameters associated with the volley such as source location, volley duration, distance between the armament projectile and the acoustic sensor, and direction of the armament projectile with respect to the acoustic sensor. The system may also include a radar coupled to the intelligent filtering module, wherein the radar can be actuated by the intelligent filtering module to emit an electromagnetic signal of a search fan width at a specific time for a specific radiation duration. In some embodiments, the intelligent filtering module may calculate the radiation duration and the search fan width of radar emission associated with the radar. In other embodiments, the system may include a network of radars coupled to the intelligent filtering module, wherein the intelligent filtering module actuates one radar within the network of radars based upon an expanded detection probability, the radar location and the radar status; wherein, the expanded detection probability may be calculated based upon the detection probability, ordinance type, orientation, aspect angle, detected obstructions, and ground elevation data.

In some embodiments, a server may couple to the intelligent filtering module for remote processing, whereby the server includes a second intelligent filtering module that can calculate the radiation duration and the search fan width of radar emission associated with the radar. Further, the second intelligent filtering module can actuate one radar within the network of radars based upon the expanded detection probability, the radar location and the radar status.

In some embodiments, the system of activating the radar array may include a radar system for detecting targets based on radar receptions; an acoustic array or network of acoustic sensors for determining the timing and direction for engaging the radar system, a processor to filter launches that are not of interest, and a communication unit that couples between each component to activate the radar array based on the acoustic detection.

In some embodiments, the system of activating the radar array may include a network of multiple radars; a processor that filters launches that are not of interest and identifies the optimal radar to activate in order to refine the acoustic detection; and a communication unit that couples between each component to activate the radar array based on the acoustic detection.

Advantageously, the novel system and method for determining the specific timing and direction for activating a radar, limits the radiation exposure of the system; and thereby, minimizes the chances of being identified by radar-detecting systems that seek to evade the radar signal. Unlike most radar systems, this system relies on an acoustic sensor to detect the direction and estimated window of time during which the radar should be activated in order to provide a precise location of the projectile's point of origin and point of impact prior to activation of the radar transmitter.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "generating," "sending," "comparing," "updating," "initiating," "retrieving," "prompting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, a system diagram of a radar system 100 having intelligent acoustic activation for detection of armament projectiles 142 from an ordnance weapon 140 including a smart select unit 110 coupled to a server 130 in accordance with some embodiments is shown. The system includes at least one smart select unit 110, a network 150, at least one acoustic module 130, at least one radar 150, and a server 130. Each smart select unit 110 may include an acoustic filtering and control module 200, processor 112, memory 114, and local data store 116. In some embodiments, the system may include one or more secondary data storage devices, such as secondary data store 120 that couples to the smart select unit 110. Each acoustic module 130 may include an acoustic receiver 132, an acoustic bearing/range estimator 134, and a signal processor 136. Each radar 150 may include a transmitter antenna 151, a receiver antenna 152, a radar transmitter 153, a radar receiver at 156, a data/display processing unit 160, and a console/display 162. The radar transmitter 153 may include a radar transmission signal generator 155 coupled to a radio transmitter 154. The radar receiver 156 may include a radio receiver 157 coupled to a signal processor 158 that couples to a direction estimator 159.

Each smart select unit 110, having local data store 116, may be coupled by a network 150 to the remote server 130, having its own acoustic filtering and control module 200, local datastore 136, and optionally, one or more remote cloud storage devices (not shown). Examples of the smart select units 110 may include, but are not limited to, personal computers, laptops, PDAs, mobile phones, computing tablets, network appliances, and the like. In some embodiments, the an acoustic filtering and control module 200 may serve as a device that communicates with the server 130 to perform the method of smart detection of an armament projectile described more in detail below. In other embodiments, the an acoustic filtering and control module 200 within the server 130 may communicate with each smart select unit 110 and serve as the sole agent that performs the method of smart detection of an armament projectile described herein. Each smart select unit 110, server 130, and any storage devices may reside on the same LAN, or on different LANs that may be coupled together through the Internet, but separated by firewalls, routers, and/or other network devices. In one embodiment, one or more smart select units 110 may couple to network 150 through a mobile communication network. In another embodiment, each smart select unit 110, server 130, and any remote storage devices (not shown) may reside on different networks. In some embodiments, the server 130 may reside in a cloud network. Although not shown, in various embodiments, the smart select unit 110 may be notebook computers, desktop computers, microprocessor-based or programmable consumer electronics, network appliances, computing tablets, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

In some embodiments, the an acoustic filtering and control module 200 may comprise processing software instructions and/or hardware logic required for the method of smart detection of an armament projectile according to the embodiments described herein. Server 130 may provide remote cloud storage capabilities for audio and target profile storage through remote storage devices (not shown) that may coupled by network.

Figure 3A:
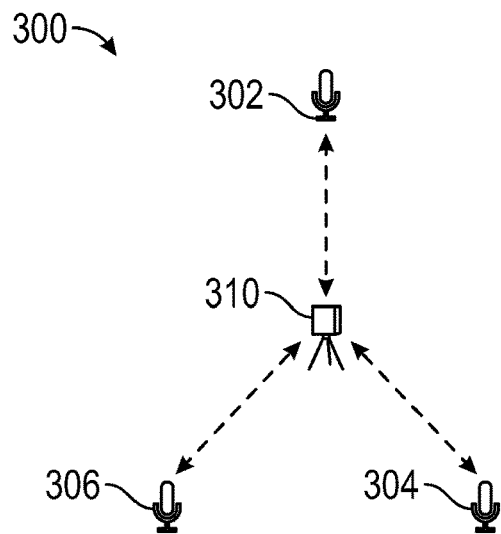
FIG. 3A is a block diagram illustrating a single radar coupled to a network of acoustic sensors.
Figure 3B:
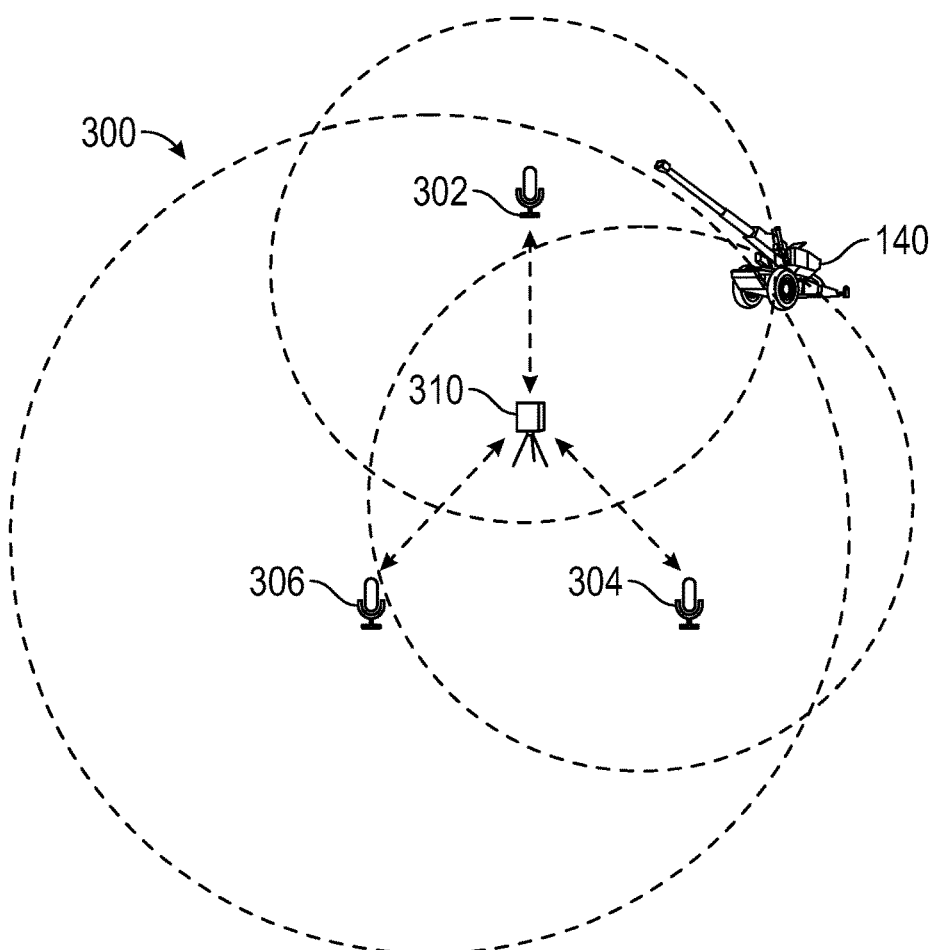
FIG. 3B is a block diagram illustrating to activation of the network of acoustic sensors of FIG. 3A positioned adjacent to an armament.
Figure 3C:
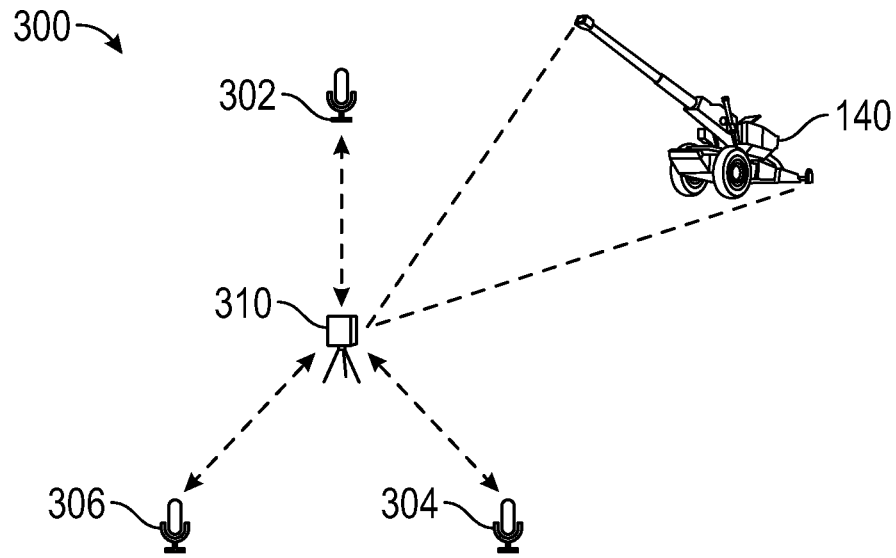
FIG. 3C is a block diagram illustrating the radar of FIG. 3A and the associated search fan of the radar after activation by the network of acoustic sensors.

In some embodiments, the networked computer system 100 for smart detection of an armament projectile may include an array of acoustic sensors for sensing one or more volleys associated with one or more armament projectiles (see FIGS. 3A-C for the multi-acoustic sensor implementation). For example, each one of the sensors of the array of acoustic sensors may include an acoustic receiver coupled to an acoustic bearing/range estimation module for generating a signal associated with direction of the sonic wave, wherein signal processor may couple to both the acoustic receiver and the acoustic bearing/range estimation module.

Figure 4A:
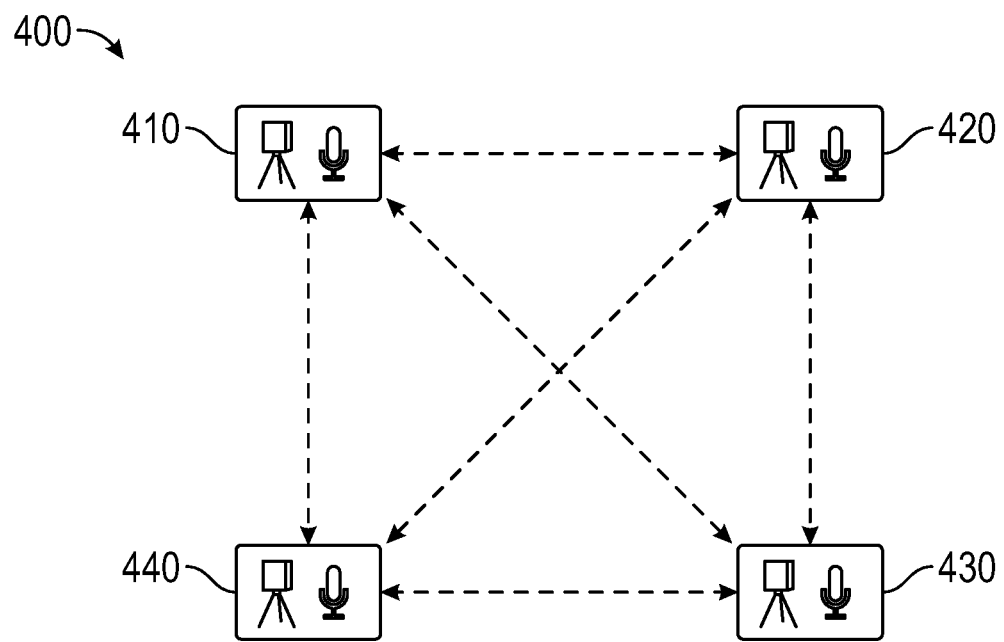
FIG. 4A is a block diagram illustrating a network of radars coupled to a network of acoustic sensors.
Figure 4B:
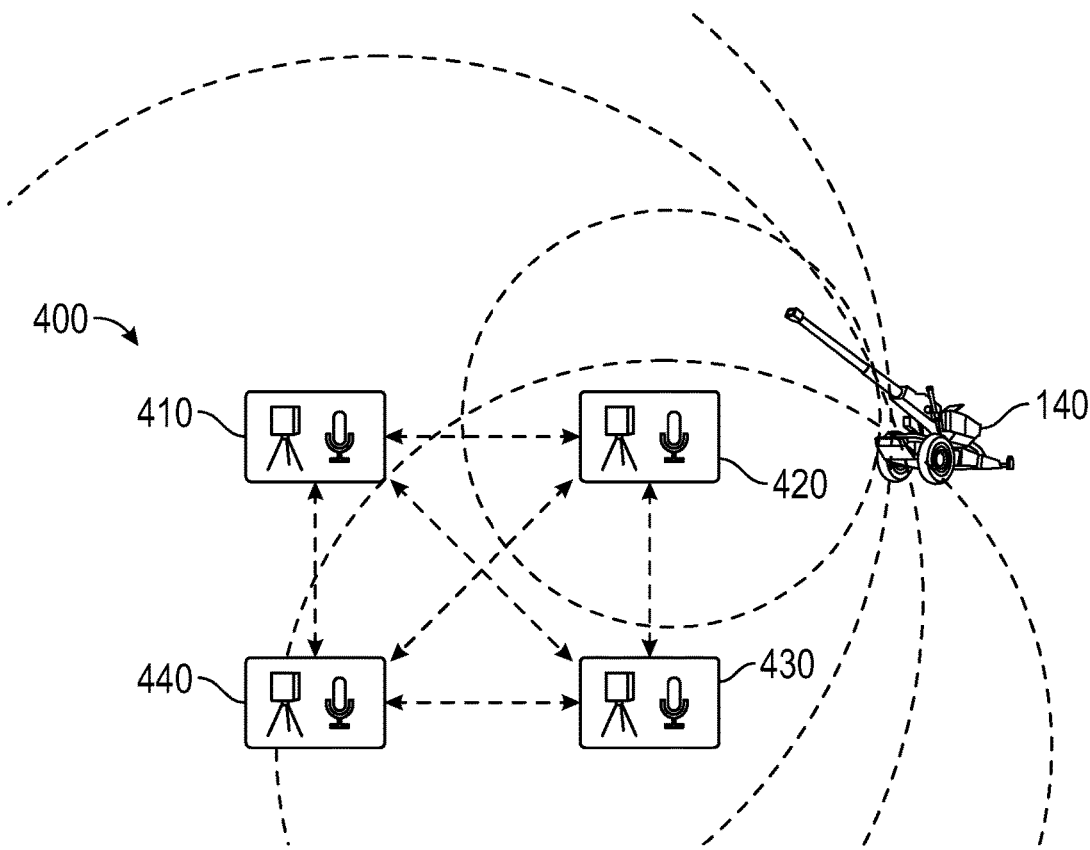
FIG. 4B is a block diagram illustrating to activation of the network of acoustic sensors of FIG. 4A positioned adjacent to an armament.
Figure 4C:
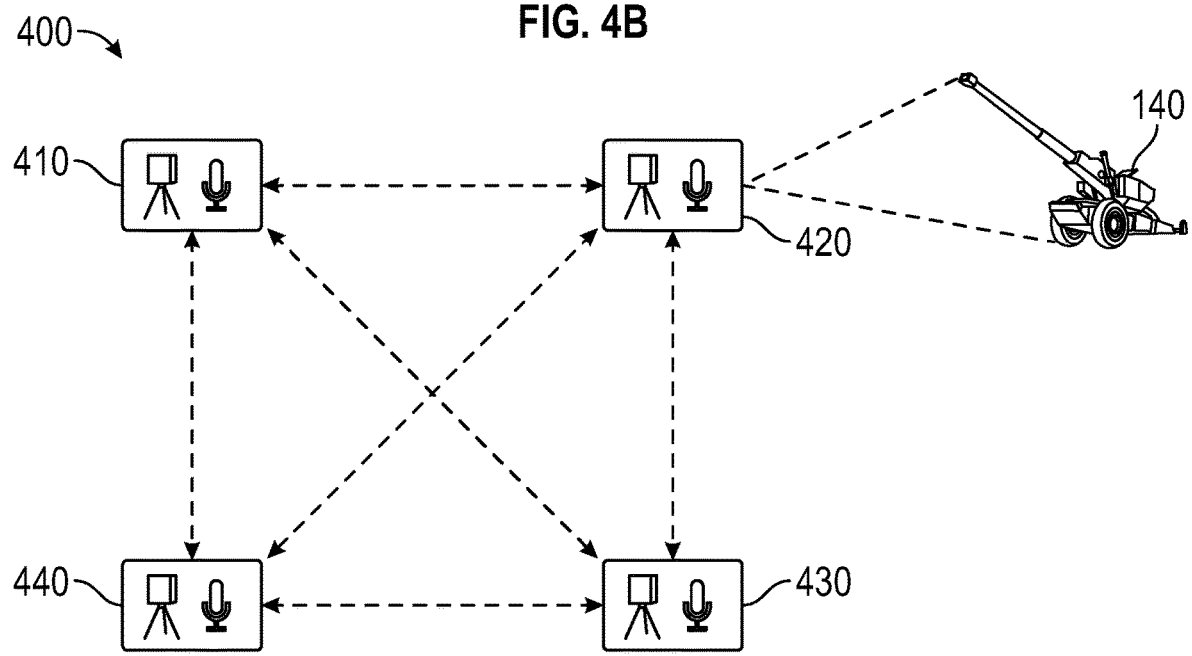
FIG. 4C is a block diagram illustrating a selected one radar from the network of radars of FIG. 4A and the associated search fan of the radar after activation by the network of acoustic sensors.

In some embodiments, the system 100 may include a network of radars coupled to the intelligent filtering module 200, wherein the intelligent filtering module actuates one radar within the network of radars based upon an expanded detection probability, the radar location and the radar status; wherein, the expanded detection probability may be calculated based upon the detection probability, ordinance type, orientation, detected obstructions, and ground elevation data (see FIGS. 4A-C for the radar network implementation).

In operation, the smart select unit 110 may actuate the acoustic module 130 to detect a volley that indicates a launching of an armament projectile. Accordingly, when a projectile is launched, the acoustic module 130 can capture and detect whether the audio associated with the launch of an armament projectile. Particularly, the acoustic receiver 132 may include one or more sensors that convert the acoustic wavefront into an analog signal. The received analog signal from receiver 132 can be amplified, filtered, and converted to a digital signal using an analog to digital converter (A/D). The digital signal is then processed using the acoustic bearing estimation 134, which provides a signal representing the direction from which a sonic wave is received by the acoustic receiver 132. The signal processor 138 couples to receive the digital signal to perform pulse compression, Doppler filtering, magnitude detection, thresholding for sonic target detection and the like, as is well known to those skilled in the art of radars and signal processing. Consequently, the signal processor 138 can provide the bearing estimate, beam magnitude, and beam phase associated with the received sonic signal.

In some embodiments, the acoustic filtering and control module 200 may couple to the acoustic module 130 for selecting a volley based upon a learning algorithm as applied to a target profile of historical system data logs. For example, a target profile may include one or more parameters associated with the volley such as source location, volley duration, distance between the armament projectile 142 and the acoustic sensor 132, and direction of the armament projectile 142 with respect to the acoustic sensor 132. Particularly, the acoustic filtering and control module 200 may couple to receive the signal and data from the acoustic module 130. The first objective of the acoustic filtering and control module 200 will be to detect a volley, wherein the volley may indicate the launch of the armament projectile 142. Within the acoustic filtering and control module 200, audio profiles of previously observed volleys may be compared to the capture audio to detect a volley associated with a user preference. In some embodiments, the acoustic filtering and control module 200 may retrieve a search zone from memory and compare the zone with the location of the source of the volley to detect whether the source is within a predetermined zone. In other embodiments, the acoustic filtering and control module 200 may elect to use an exclusion zone, which is compared with the location of the source of the volley to detect whether the source is outside of the exclusion zone. When acoustic filtering and control module 200 determines that the source is within a predetermined zone or outside of the exclusion zone, the acoustic filtering and control module 200 may instruct the acoustic module 130 to capture one or more parameters associated with the volley and to store these in a target profile. Additionally, the acoustic filtering and control module 200 may select one radar from an array of radars based upon whether the radar possesses the highest expanded detection probability relative to its location and status. The acoustic filtering and control module 200 can calculate the expanded detection probability for each radar, along with a radiation duration and a search fan width based upon a learning algorithm applied to the target profile of historical system data and logs. Specifically, the acoustic filtering and control module 200 may retrieve the target profile and calculate the radiation duration from the detected distance from the source and the detected direction of the projectile. The acoustic filtering and control module 200 may use the source location, volley duration, detected distance and the detected direction to calculate the search fan width. Further, the acoustic filtering and control module 200 may activate the radar for a period equal to the calculated radiation duration, wherein the transmitted radar signal having the calculated search fan width. Details associated with the functioning of the aforementioned features of the acoustic filtering and control module 200 will be described in detail with reference to FIG. 2.

When the radar 150 is actuated, the radar transmitter 154 can send an electromagnetic signal (radar signal), having the calculated search fan width, for the calculated radiation duration. Afterwards, the radar 150 can use the radar receiver 156 to sense the reflected radar signal. Accordingly, the signal processor 158 and detector/estimator 159 may detect one or more parameters associated with location and motion of the projectile as input to track the armament projectile. More specifically, the detector/estimator 159 may be responsible for detection, thresholding, parameter estimation, and tracking. Within the display unit 160, the data/display processor 161 can process the data relating to the projectile of interest and display the signal tracking on the console/display 162.

Advantageously, the system and method for determining the specific timing and direction for actuating an radar limits the radiation exposure of the system; and thereby, minimizes the chances of being identified by radar-detecting systems that seek to destroy or to circumvent the system.

It is appreciated that the components of exemplary operating environment 100 are exemplary and more or fewer components may be present in various configurations. It is appreciated that operating environment may be part of a distributed computing environment, a cloud computing environment, a client server environment, and the like. In other words, as would be apparent to one of ordinary skill in the art after reading this description, the various features and functionality described herein may be implemented in the merchant card system using any arrangement components necessary to perform the secondary merchant card generation and delivery; and can be implemented in one or more separate or shared modules in various combinations and permutations.

Figure 2:
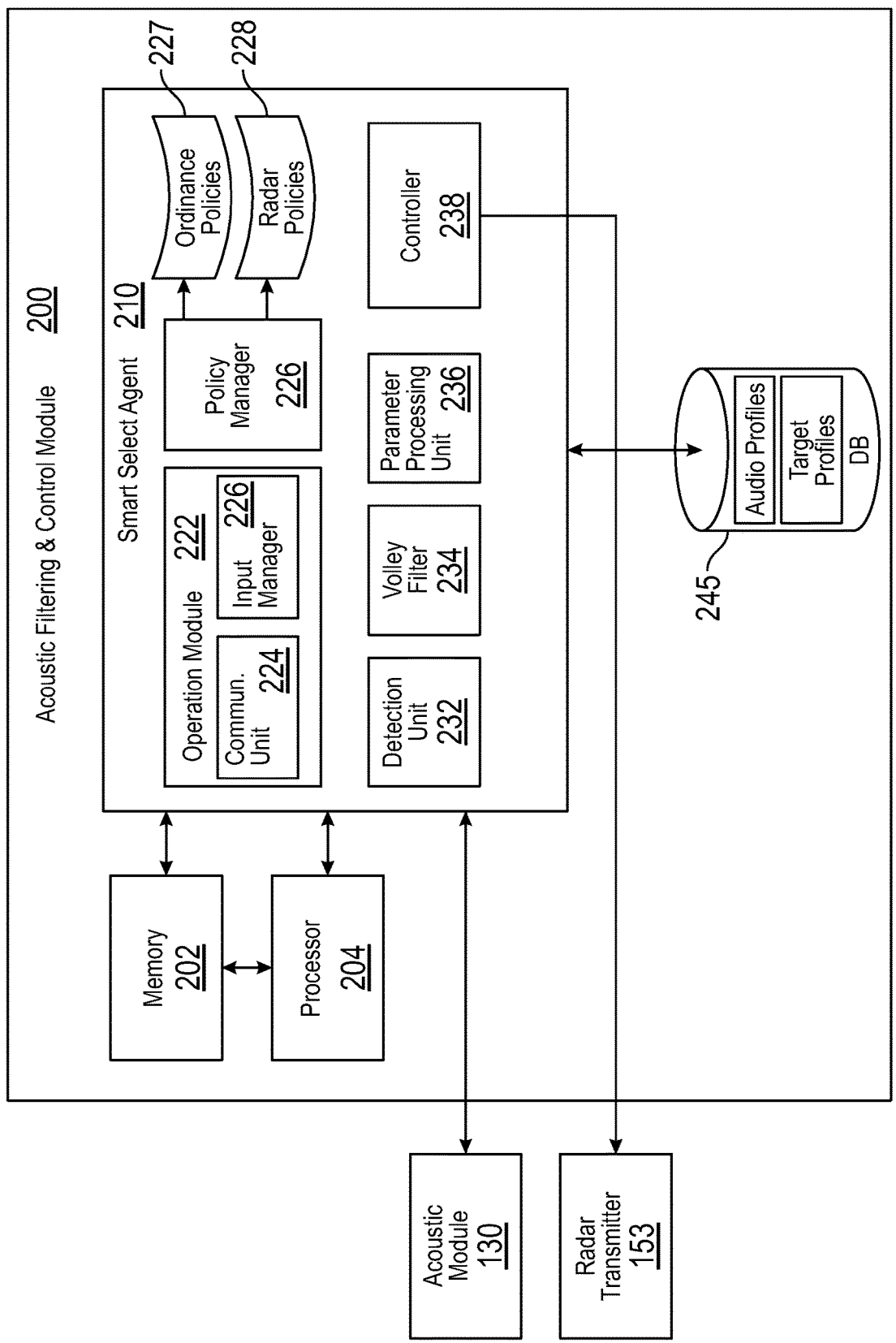
FIG. 2 is a block diagram showing the contents of the acoustic filtering and control module of FIG. 1 in some embodiments.

Referring to FIG. 2, a block diagram showing the contents of the acoustic filtering and control module of FIG. 1 in some embodiments is shown. An exemplary embodiment of the acoustic filtering and control module 200 may include a memory 202, a processor 204, a smart select agent 220, and a local datastore 245. The smart select agent 220 may include an operation module 222, having a communication unit 224 and input manager 225 [both for communicating with the acoustic module 130 and the radar transmitter 153]. Further, the operation module 222 may include a policy manager 226, having ordinance policies 227 and radar policies 228 which include rules for defining the ordinance and radar policies during each tracking session. The smart select agent 220 may also include an acoustic signal detection unit 232, a volley filter 234, a parameter processing unit 236, and a controller 238.

In operation, the acoustic filtering and control module 200 may couple to receive the processed digital signal from the acoustic module 130 for selecting a volley based upon a learning algorithm as applied to a target profile of historical system data logs. For example, The operation module 222 may monitor the communication between the acoustic module 130 and the acoustic filtering and control module 200, wherein the communication unit 224 regulates the communications between the modules (130, 200) and the input manager 220 receives the input from the signal processor 136. Based upon the policy designated by the user, the processed digital signal will be further processed. Specifically, the policy manager 226 can set the type of ordinance that is tracked in accordance with to an ordinance policy (227). Similarly, the policy manager 226 can set the details associated with the radar transmission and its signal processing in accordance with to a radar policy (228). These policies may be set by the user, owner, manufacturer, and the like.

In operation during the activation of the acoustic module 130 to detect a volley that indicates a launching of an armament projectile, the acoustic signal detection unit 232 in conjunction with the communication unit 224 may retrieve an audio profile from the datastore 245 for the purpose of comparing the processed digital signal received from the acoustic module 130 with the audio profile. Specifically, audio profiles of previously observed volleys may be compared to the capture audio to detect a volley associated with a user preference. The acoustic signal detection unit 232 in cooperation with the parameter processing unit 236 may determine the source of the volley.

Prior to the radar selection phase of operation, the controller 238 can retrieve a search zone datastore 245 for the purpose of comparing the radar location with the location of the source of the volley to detect whether the source is within a predetermined zone. In other embodiments, the controller 238 can retrieve an exclusion zone that can be compared with the location of the source of the volley to detect whether the source is outside of the exclusion zone. When the source is determined to be within the predetermined zone, the parameter processing unit 236 may capture one or more parameters associated with the volley, by filtering the processed digital signal using the volley filter 234. The parameter processing unit 236 may store these parameters in datastore 245 within a target profile of volleys detected associated with each specific source.

During the radar selection phase, the controller 238 can generate a control signal to send to a select one of the radars to begin transmitting its radar signal. Particularly, the controller 238 may select one radar from an array of radars based upon whether the radar possesses the highest expanded detection probability relative to its location and status. Further, the parameter processing unit 236 may calculate a radiation duration and a search fan width based upon a learning algorithm associated with a target profile of historical system data and logs. Specifically, the parameter processing unit 236 may retrieve the target profile and calculate the radiation duration from the detected distance from the source and the detected direction of the projectile. Similarly, the parameter processing unit 236 may calculate the search fan width based upon the source location, volley duration, detected distance and the detected direction.

During the radar actuation phase, the controller 238 may activate the radar transmitter 153 of the selected radar for a period equal to the calculated radiation duration, wherein the radar signal of the radar is transmitted at the calculated search fan width. Consequently, the radar receiver 156 may include sense the reflected radar signal, wherein the reflected signal is received by the radio receiver 157 and processed by signal processor 158. Accordingly, the detector/estimator 159 may perform detection, thresholding, parameter estimation, and tracking as is known in the art. Particularly, the detector/estimator 159 may detect one or more parameters associated with location and motion of the projectile as input to track the armament projectile. The display module 160 including the data/display processing unit 162 and the console/display 164 can present the resulting output of the detector/estimator, making these available for the user.

Referring to FIG. 3A, a block diagram illustrating a single radar 310 coupled to a network of acoustic sensors is shown. Particularly, an array of acoustic sensors including sensors (302, 304 and 306) may couple to the radar 310. During operation, the acoustic sensors can detect the volleys associated with the armament projectile 140 as shown in FIG. 3B. Specifically, FIG. 3B displays a block diagram illustrating to activation of the network of acoustic sensors of FIG. 3A positioned adjacent to an armament. After detecting whether the source the prescribed limitations of zone and ordinance type, the acoustic sensors can actuate the radar 310 at a search fan width calculated as detailed by the method of smart detection of an armament projectile as shown in FIG. 3C. Specifically, FIG. 3C shows a block diagram illustrating the radar of FIG. 3A and the associated search fan of the radar after activation by the network of acoustic sensors.

Referring to FIG. 4A, a block diagram illustrating a network of radars coupled to a network of acoustic sensors is shown. In some embodiments, each radar may couple to an acoustic sensor as one unit, wherein each pair is located at a specific matrix point of the network. Particularly, units 410, 420, 430, and 440 may include an acoustic sensor coupled to a radar, whereby unit 410, 420, 430, and 440 couple to form a network and system of smart detection of an armament projectile. During operation, the acoustic sensors can detect the volleys associated with the armament projectile 140 as shown in FIG. 4B. Specifically, FIG. 4B shows a block diagram illustrating system during activation of the network of acoustic sensors of FIG. 4A positioned adjacent to an armament. After detecting whether the source the prescribed limitations of zone and ordinance type, one of the acoustic sensors can actuate one radar 420 at a search fan width calculated as detailed by the method of smart detection of an armament projectile as shown in FIG. 4C. Specifically, FIG. 4C displays a block diagram illustrating a selected one radar from the network of radars of FIG. 4A and the associated search fan of the radar after activation by the network of acoustic sensors.

As used herein, the term agent and module might describe a given unit of functionality that can be performed in accordance with one or more embodiments of the present invention. As used herein, an agent and/or a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 5A:
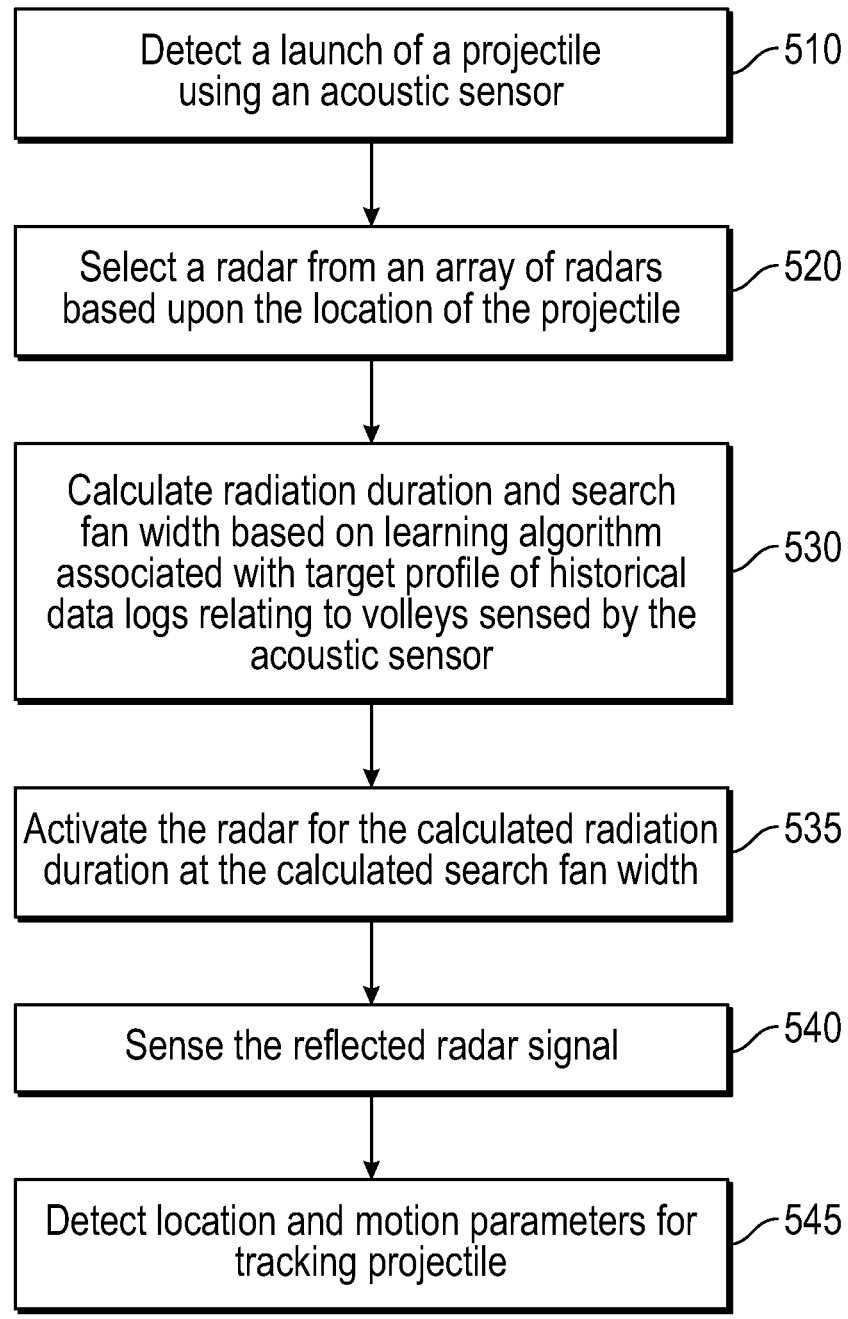
FIG. 5A is a flow diagram of a method of smart detection of an armament projectile in accordance with some embodiments.
Figure 5B:
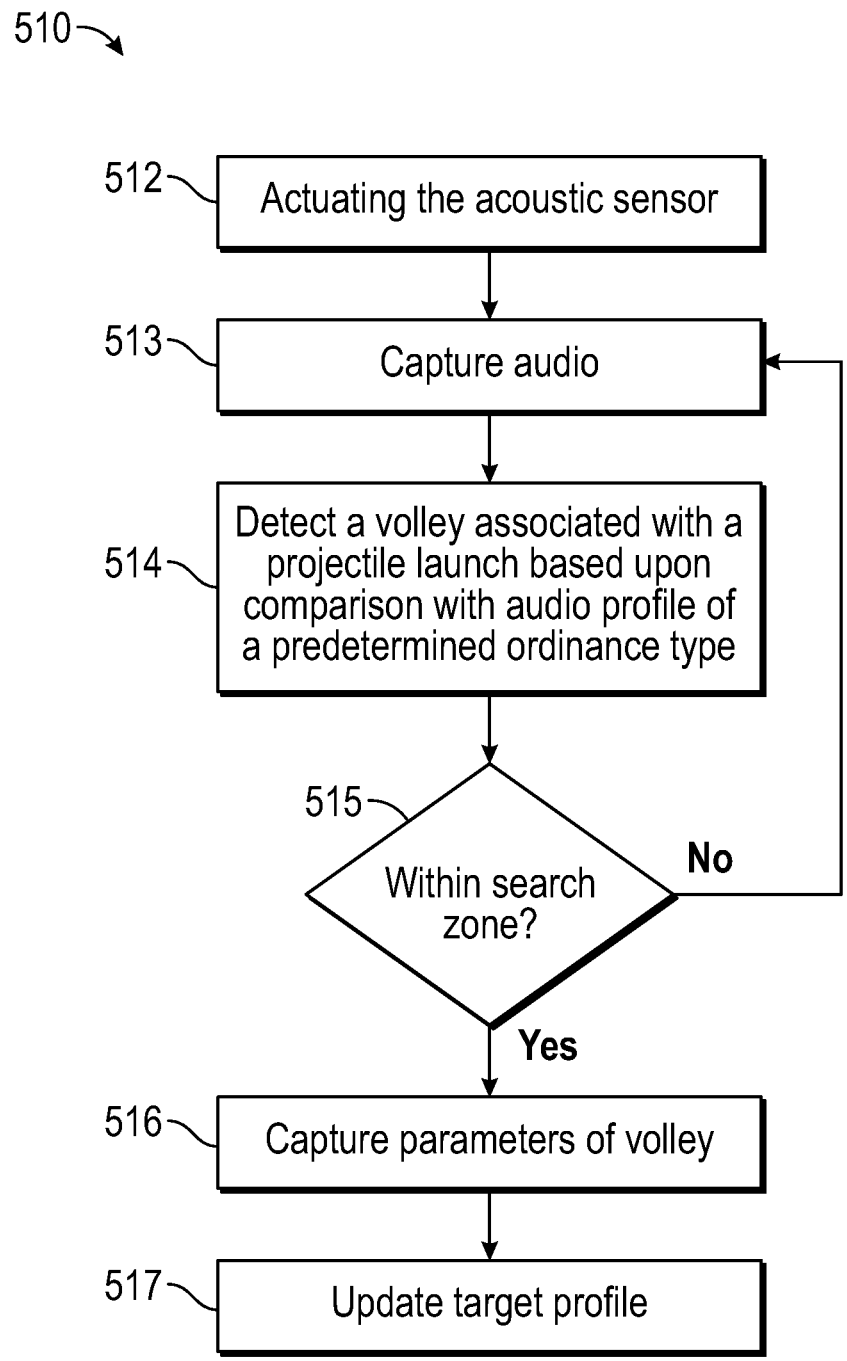
FIG. 5B is a flow diagram of a method of detecting a launch of a projectile using an acoustic sensor according to the method as illustrated in FIG. 5A.

Referring to FIG. 5A, a flow diagram of a method for smart detection of an armament projectile in accordance with some embodiments is shown. The method may include detecting a launch of the armament projectile using an acoustic sensor in an action 510. For example, the method for detecting the launch of an armament projectile may include actuating an acoustic sensor as shown in FIG. 5B. Further, the method may include capturing audio in an action 513 and detecting a volley indicative of an armament projectile in an action 514. For example, the method may include retrieving an audio profile having a user-preferred ordinance type and comparing the captured audio with the audio profile. The method for detecting a launch may further include determining whether the volley is within a predetermined zone in a decision action 515. If the volley is determined to be within a search zone, the method may further include capturing one or more parameters associated with the volley in an action 516 and updating a target profile with the captured parameters in an action 517.

Figure 5C:
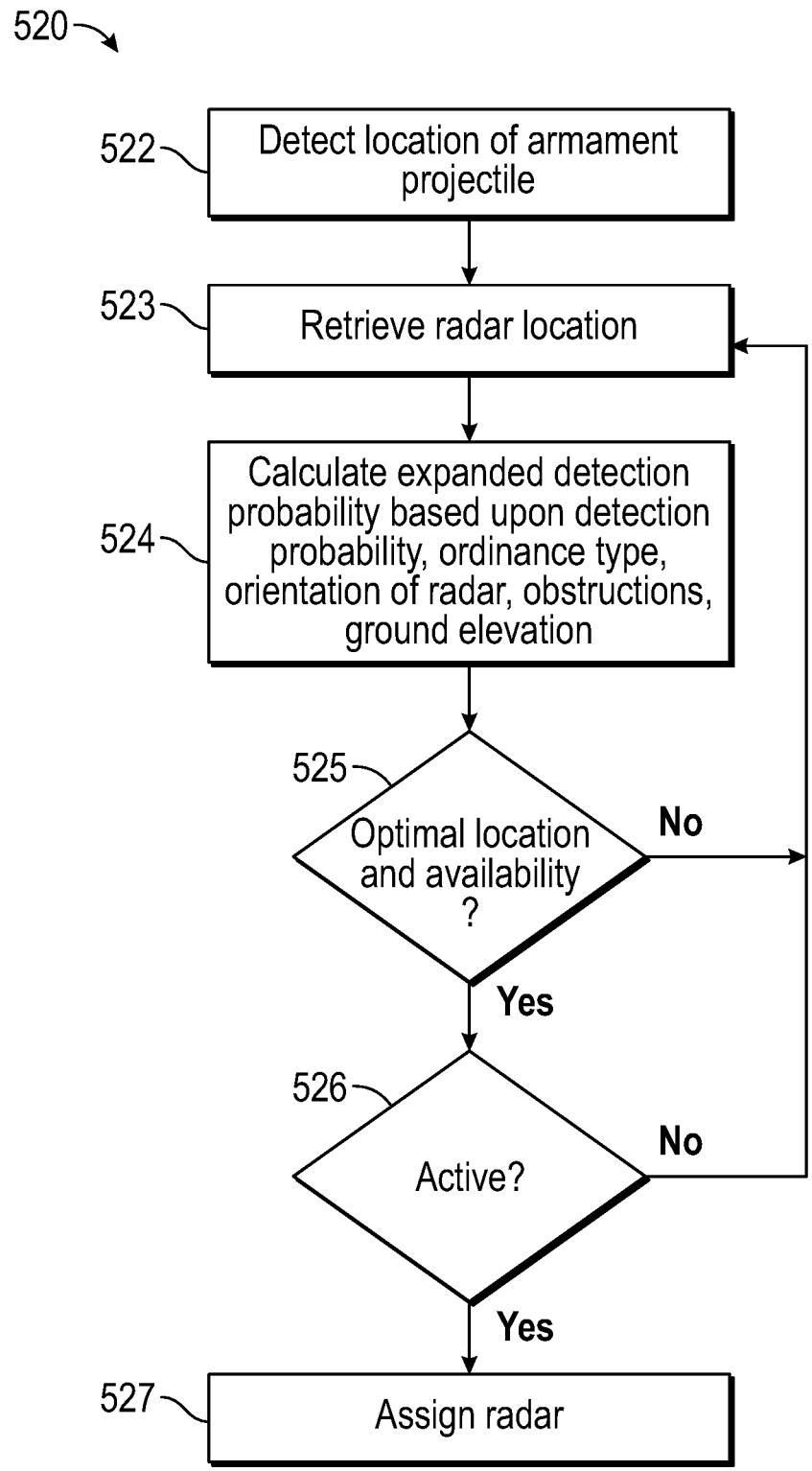
FIG. 5C is a flow diagram of a method of selecting a radar form an array of radars based upon the location of the projectile according to the method as illustrated in FIG. 5A.
Figure 6:
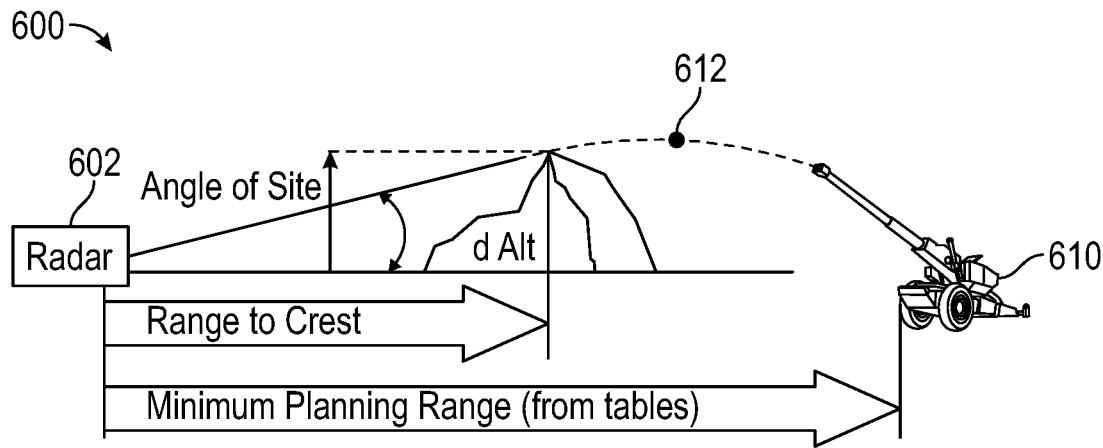
FIG. 6 is a block diagram illustrating a radar and its positioning relative to an estimated ordinance location as it relates to how the expanded detection probability (EXDP) for a radar may be calculated in accordance with some embodiments.

The method for smart detection of an armament projectile may include selecting a radar from an array of radars based upon location of the armament projectile in an action 520. For example, the method for selecting a radar from an array of radars may include detecting location of the armament projectile in an action 522 of FIG. 5C. The method for selecting a radar may further include retrieving the radar location in an action 523 and calculating expanded detection probability (EXDP) for each radar based upon detection probability, ordnance type, orientation of radar, aspect angle, obstructions, and ground elevation in an action 524. Specifically, referring to FIG. 6, a block diagram illustrates a radar 602 and its positioning relative to an estimated ordnance location 610 as it relates to how the expanded detection probability (EXDP) for a radar may be calculated in accordance with some embodiments. For example, the expanded detection probability (EXDP) (as shown in FIG. 6) may be calculated as follows:

$$EXDP = p[t] * k * \text{bool}|q| * \text{bool}|r|;$$

$$k = (90° - \text{angle of site})/90°$$

where p=detection probability; t=ordnance type; q=obstruction(s); and r=orientation of the radar. The variable k represents masking, which is a function of the intervening crests. Specifically, the detection probability can be prescribed by the manufacturer of the radar 602 as the range for the given ordnance type based on technical specifications of the specific radar system. It may be retrieved from memory. Masking can be defined as a function of the percentage of the 90-degree vertical arc obstructed by the elevation of intervening crests between the radar and the initially estimated ordnance launch location 610 associated with the armament projectile 612. The intervening crests can be calculated using the ground elevation and distance that produces the largest angle of obstruction relative to the radar location. Obstructions can be defined as a first predetermined flag indicating whether or not a configured "cut out" in the horizontal arc exists, such that the radar does not have a clear line of sight to the estimated ordnance launch location. Orientation can be defined as a second predetermined flag indicating whether the radar can be oriented in the direction of the estimated ordnance launch location. For example, in some cases, the radar 602 may be fixed in position that cannot be automatically oriented or otherwise has a limited scanning field. In other embodiments, the radar 602 can possess a 360-degree search capability. For projectile detection and tracking, the radar 602 can observe the projectile for a predetermined time as it travels along an arc in order to make a determination of its position. Intervening crests tend to reduce the window of time available for observing this arc. The aspect angle is the angle measured from radar antenna to the target path of the object. The aspect angle must be greater than 1600 mils. This means the object must be traveling toward the radar. Objects with aspect angles approaching 1600 mils may not be detected.

Referring back to FIG. 5C, the method for radar selection may include determining whether the radar possesses the highest expanded detection probability (EXDP) relative to its location and status in an action 525. When a match of location and status occurs, the method may include assigning the radar as the one that performs the projectile tracking in an action 526.

Further, the method for smart detection of an armament projectile may include calculating a radiation duration and a search fan width based upon a learning algorithm associated with a target profile of historical system data and logs associated with volleys sensed by the acoustic sensor in an action 530. In an action 535, the method may include activating the radar for a period equal to the calculated radiation duration, wherein the transmitted radar signal having the calculated search fan width. Further, the method may include sensing the reflected radar signal in an action 540. Moreover the method of smart detection of an armament projectile may include detecting one or more parameters associated with location and motion of the projectile as input to track the armament projectile using the radar in an action 545.

Figure 7:
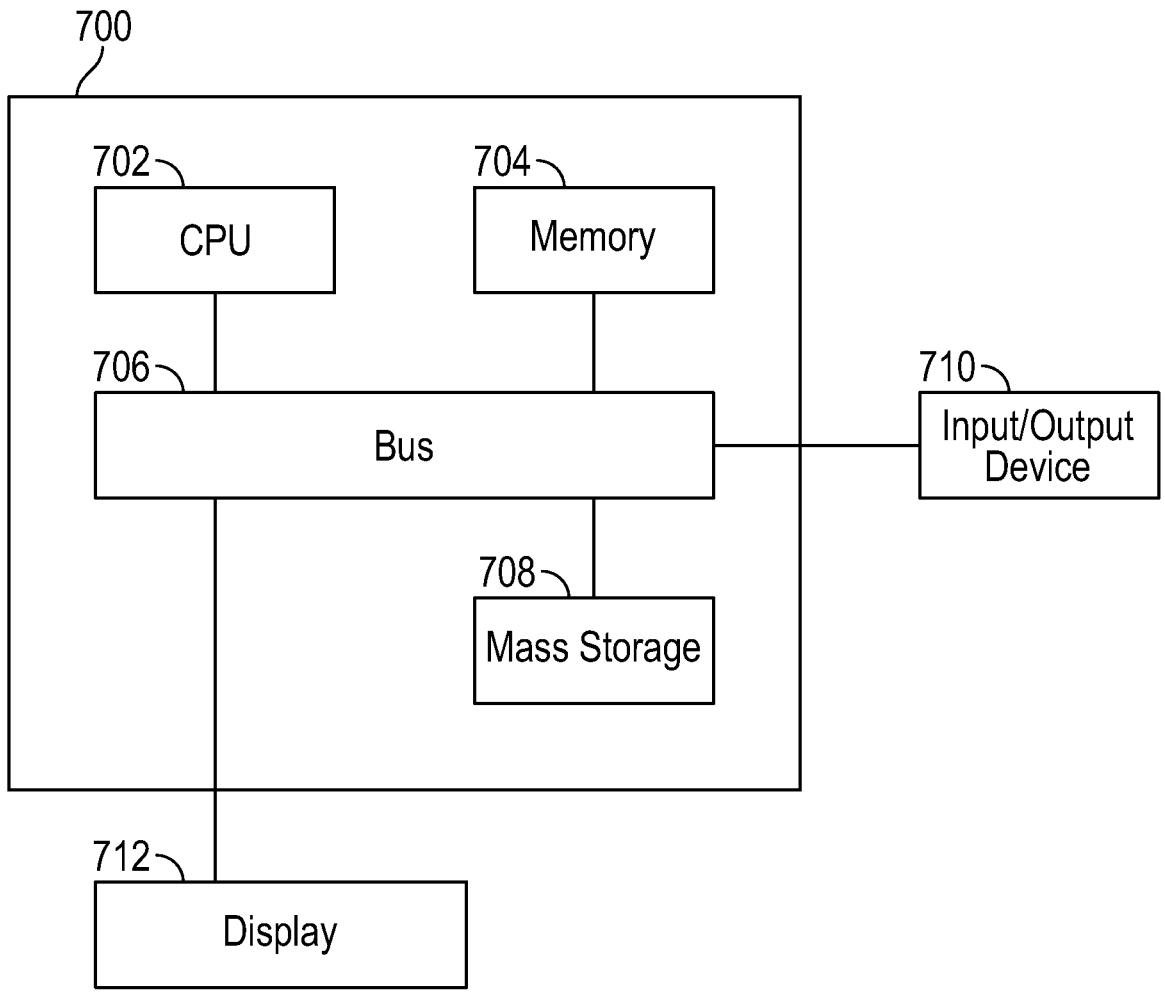
FIG. 7 is an illustration showing an exemplary computing device, which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device, which may implement the embodiments described herein. The computing device of FIG. 7 may be used to perform embodiments of the functionality for performing smart detection of armament projectiles in accordance with some embodiments. The computing device includes a central processing unit (CPU) 702, which is coupled through a bus 706 to a memory 704, and mass storage device 708. Mass storage device 708 represents a persistent data storage device such as a floppy disc drive or a fixed disc drive, which may be local or remote in some embodiments. The mass storage device 708 could implement a backup storage, in some embodiments. Memory 704 may include read only memory, random access memory, etc. Applications resident on the computing device may be stored on or accessed through a computer readable medium such as memory 704 or mass storage device 708 in some embodiments. Applications may also be in the form of modulated electronic signals modulated accessed through a network modem or other network interface of the computing device. It should be appreciated that CPU 702 may be embodied in a general-purpose processor, a special purpose processor, or a specially programmed logic device in some embodiments.

Display 712 is in communication with CPU 702, memory 704, and mass storage device 708, through bus 706. Display 712 is configured to display any visualization tools or reports associated with the system described herein. Input/output device 710 is coupled to bus 706 in order to communicate information in command selections to CPU 702. It should be appreciated that data to and from external devices may be communicated through the input/output device 710. CPU 702 can be defined to execute the functionality described herein to enable the functionality described with reference to FIGS. 1-6. The code embodying this functionality may be stored within memory 704 or mass storage device 708 for execution by a processor such as CPU 702 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for smart detection of an armament projectile, comprising:
    detecting a launch of the armament projectile using an acoustic sensor;
    selecting a radar from an array of radars based upon location of the armament projectile and an expanded detection probability;
    calculating a radiation duration and a search fan width based upon a learning algorithm applied to a target profile of historical system data and logs associated with volleys sensed by the acoustic sensor;
    activating the radar for a period equal to the calculated radiation duration, wherein a radar signal is transmitted at the calculated search fan width;
    sensing the reflected radar signal; and
    detecting one or more parameters associated with location and motion of the projectile as input to track the armament projectile using the radar.

2. The method of claim 1, wherein the detecting of the launch of an armament projectile comprises,
    actuating the acoustic sensor;
    capturing audio;
    detecting a volley wherein the volley indicate the launch of the armament projectile;
    detecting whether the volley is within a predetermined zone;
    capturing, when the volley is within the predetermined zone, one or more parameters associated with the volley; and
    updating the target profile with the one or more parameters.

3. The method of claim 2, wherein the detecting of the volley comprises,
    retrieving an audio profile from storage, the audio profile describing a predetermined ordnance type;
    comparing the captured audio to the audio profile; and
    designating, in response to a match between the captured audio and the audio profile, the captured audio as the volley.

4. The method of claim 2, wherein the detecting whether the volley is within a predetermined zone comprises,
    detecting location of the armament projectile;
    retrieving a search zone from memory;
    comparing the detected location with the search zone; and
    affirming, in response to a match between the detected location and the search zone, the volley to be within the predetermined zone.

5. The method of claim 2, wherein the detecting whether the volley is within a predetermined zone comprises,
    detecting location of the armament projectile;
    retrieving an exclusion search zone from memory;
    comparing the detected location with the exclusion search zone; and
    affirming, in response to a match outside of the exclusion search zone, the volley to be within the predetermined zone.

6. The method of claim 2, wherein the capturing one or more parameters associated with the volley comprises,
    detecting source location associated with the volley;
    sensing volley duration;
    detecting distance between the armament projectile and the acoustic sensor; and
    detecting direction to the armament projectile with respect to the acoustic sensor.

7. The method of claim 1, wherein the selecting the radar from an array of radars based upon location of the armament projectile comprises,
- detecting location of the armament projectile;
- retrieving the radar location;
- calculating an expanded detection probability for each radar; and
- comparing each expanded detection probability associated for each radar within the array of radars;
- identifying radar having the highest expanded detection probability;
- verifying radar location and status associated with the radar having the highest expanded detection probability;
- assigning, in response to the verified radar, the radar.

8. The method of claim 7, wherein the calculating of the expanded detection probability comprises,
- identifying ordnance type based upon matched audio profile;
- retrieving detection probability;
- retrieving orientation of the radar;
- retrieving one or more obstructions of the radar;
- retrieving ground elevation data associated with masking between radars of the array and the armament projectile;
- calculating aspect angle; and
- calculating expanded detection probability based upon the detection probability, ordnance type, orientation, aspect angle, detected obstructions, and ground elevation data.

9. The method of claim 7, wherein the verifying radar location and status comprises,
- retrieving the radar location;
- retrieving radar status;
- comparing, in response to the radar status equal to available, the detected location of the armament projectile with the radar;
- designating, in response to the distance between the detected location and the radar location to be within a predetermined range, the radar to be verified.

10. The method of claim 1, wherein the calculating of the radiation duration and the search fan width based upon a learning algorithm associated with a target profile comprises,
- retrieving the target profile;
- parsing the source location, the volley duration, the detected distance and the detected direction from the target profile;
- calculating the radiation duration based upon the detected distance and the detected direction; and
- calculating the search fan width based upon the source location, the volley duration, the detected distance and the detected direction.

11. The method of claim 1, wherein the activating a radar for a period equal to the calculated radiation duration, wherein a radar signal is transmitted at the calculated search fan width comprises,
- actuating the radar to emit electromagnetic energy, wherein the energy having the search fan width and the emission duration is equal to the calculated radiation duration.

12. The method of claim 1, wherein the detecting one or more parameters associated with location and motion of the projectile as input to track the armament projectile comprises,
- identifying a time differential between the emitted radar signal and the reflected radar signal;
- detecting a Doppler shift between the emitted radar signal and the reflected radar signal;
- calculating, in response to the identified time differential, the location of the target object; and
- calculating, in response to the detected Doppler shift, the velocity of the target object.

13. An armament projectile smart detection system for smart detection of an armament projectile, comprising:
- an array of acoustic sensors for sensing one or more volleys associated with one or more armament projectiles;
- an intelligent filtering module coupled to the array of acoustic sensors, the intelligent filtering module having a learning algorithm as applied to a target profile of historical system data logs to select a volley, wherein the intelligent filtering module calculates a radiation duration and a search fan width for radar emission; and
- a radar coupled to the intelligent filtering module to receive the radiation duration and search fan width associated with the selected volley, wherein the radar is actuated by the intelligent filtering module to emit an electromagnetic signal of the search fan width at a specific time for the radiation duration.

14. The smart armament detection system of claim 13, wherein each one of the sensors of the array of acoustic sensors comprises,
- an acoustic receiver coupled to receive a sonic wave;
- an acoustic bearing/range estimation module coupled to the acoustic receiver to receive data associated with the sonic wave to generate a signal associated with direction of the sonic wave and to estimate a range; and
- a signal processor coupled to the acoustic receiver and the acoustic bearing/range estimation module to receive data associated with the sonic wave and the signal associated with direction of the sonic wave and the estimated range.

15. The smart armament detection system of claim 13, wherein the intelligent filtering module comprises,
- an acoustic signal detection unit;
- an volley filter coupled to the acoustic signal processor to receive detected signal data to detect a predetermined ordnance type;
- a parameter processing unit coupled to the acoustic signal detection unit to receive detected signal data to track the armament projectile associated with the volley; and
- a controller coupled to the volley filter to receive the detected ordnance type and the controller coupled to the parameter processing unit to receive data associated with the tracked armament projectile to generate a signal for controlling the actuation of the transmit and receive functions of the radar.

16. The smart armament detection system of claim 13, wherein the radar comprises,
- a radar transmitter;
- a radar receiver; and
- a controller coupled to the radar transmitter and the radar receiver.

17. A non-transitory computer-readable medium including code for performing a method of smart detection of an armament projectile, the method comprising:
- detecting a launch of the armament projectile using an acoustic sensor;
- selecting a radar from an array of radars based upon location of the armament projectile;
- calculating a radiation duration and a search fan width based upon a learning algorithm applied to a target profile of historical system data and logs;

activating a radar for a period equal to the calculated radiation duration, wherein a radar signal is transmitted at the calculated search fan width;

sensing the reflected radar signal; and detecting one or more parameters associated with location and motion of the projectile as input to detonate the armament projectile.

18. The computer-readable medium of claim 17, wherein the detecting of the launch of an armament projectile comprises, actuating the acoustic sensor;

capturing audio;

detecting a volley signifying the launch of the armament projectile;

capturing one or more parameters associated with the volley; and updating the target profile with the one or more parameters.

19. The computer-readable medium of claim 17, wherein the selecting the radar from an array of radars based upon location of the armament projectile comprises, detecting location of the armament projectile;

retrieving a search zone from memory;

comparing the detected location with the search zone; and determining, in response to a match between the detected location and the search zone, whether the radar possesses the highest expanded detection probability relative to its location and status.

20. The computer-readable medium of claim 17, wherein the calculating a radiation duration and a search fan width based upon a learning algorithm associated with a target profile of historical system data and logs comprises:

retrieving the target profile;

parsing the source location, the volley duration, the detected distance and the detected direction from the target profile;

calculating the radiation duration based upon the detected distance and the detected direction; and calculating the search fan width based upon the source location, the volley duration, the detected distance and the detected direction.

* * * * *